United States Patent
Solyom et al.

(10) Patent No.: US 9,594,373 B2
(45) Date of Patent: *Mar. 14, 2017

(54) APPARATUS AND METHOD FOR CONTINUOUSLY ESTABLISHING A BOUNDARY FOR AUTONOMOUS DRIVING AVAILABILITY AND AN AUTOMOTIVE VEHICLE COMPRISING SUCH AN APPARATUS

(71) Applicant: VOLVO CAR CORPORATION, Gothenburg (SE)

(72) Inventors: Stefan Solyom, Olofstorp (SE); Ake Blom, Ljungskile (SE); Marcus Nils Gunnar Rothoff, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,805

(22) Filed: Feb. 24, 2015

(65) Prior Publication Data

US 2015/0253772 A1 Sep. 10, 2015

(30) Foreign Application Priority Data

Mar. 4, 2014 (EP) ..................................... 14157579

(51) Int. Cl.
*G05D 1/00* (2006.01)
*G05D 1/02* (2006.01)
(Continued)

(52) U.S. Cl.
CPC ......... *G05D 1/0061* (2013.01); *B60W 50/082* (2013.01); *B60W 50/14* (2013.01);
(Continued)

(58) Field of Classification Search
CPC ............. G05D 1/02512; G05D 1/0276; G05D 1/0061; G08G 1/16; B60W 50/14; B60W 50/082
(Continued)

(56) References Cited

U.S. PATENT DOCUMENTS

| 4,486,694 A | 12/1984 | Ohba et al. |
| 5,774,069 A | 6/1998 | Tanaka et al. |

(Continued)

FOREIGN PATENT DOCUMENTS

| DE | 102011082375 | 3/2013 |
| DE | 102012002306 | 8/2013 |

(Continued)

OTHER PUBLICATIONS

Website XP 002685537, Youtube Video Uploaded on Jul. 29, 2011, Retrieved from the Internet on Jun. 22, 2015, 3 Pages, "Autopilot Driving—EU Research project/Volkswagen Car" https://www.youtube.com/watch?v=XIMLUI6WPoU.

(Continued)

*Primary Examiner* — Anne M Antonucci
(74) *Attorney, Agent, or Firm* — Brooks Kushman P.C.

(57) ABSTRACT

Provided are a method and apparatus for continuously establishing a boundary for autonomous driving availability, in a vehicle having autonomous driving capabilities and comprising at least one remote sensor for acquiring vehicle surrounding information and at least one vehicle dynamics sensor for determining vehicle dynamics parameters. The method and apparatus include at least one of a positioning arrangement that provides map data with associated information, a route planning arrangement that enables route planning, a vehicle driver monitoring arrangement that provides driver monitoring information, and a real time information acquiring arrangement that acquires at least one of (Continued)

traffic information and weather information. The boundary is calculated based on a planned route and at least one of vehicle surrounding information, vehicle dynamics parameters, driver monitoring information, map data, traffic information and weather information, for the planned route. Changes in the calculated boundary are output to a human machine interface in the vehicle.

10 Claims, 3 Drawing Sheets

(51) Int. Cl.
    *B60W 50/08* (2012.01)
    *B60W 50/14* (2012.01)
    *G08G 1/16* (2006.01)

(52) U.S. Cl.
    CPC ......... *G05D 1/0212* (2013.01); *G05D 1/0276* (2013.01); *G08G 1/16* (2013.01); *G05D 2201/0213* (2013.01)

(58) Field of Classification Search
    USPC .......................................................... 701/25
    See application file for complete search history.

(56) References Cited

U.S. PATENT DOCUMENTS

| | | | |
|---|---|---|---|
| 7,979,172 | B2 | 7/2011 | Breed |
| 8,260,482 | B1 | 9/2012 | Szybalski et al. |
| 8,433,470 | B1 | 4/2013 | Szybalski et al. |
| 8,718,861 | B1 | 5/2014 | Montemerlo et al. |
| 8,825,259 | B1 | 9/2014 | Ferguson |
| 8,849,494 | B1 | 9/2014 | Herbach et al. |
| 8,996,224 | B1 | 3/2015 | Herbach et al. |
| 9,134,731 | B2 | 9/2015 | Healey et al. |
| 9,182,764 | B1 | 11/2015 | Kolhouse et al. |
| 2008/0027599 | A1 | 1/2008 | Logan et al. |
| 2008/0161986 | A1 | 7/2008 | Breed |
| 2008/0161987 | A1 | 7/2008 | Breed |
| 2009/0037033 | A1 | 2/2009 | Phillips et al. |
| 2010/0256835 | A1 | 10/2010 | Mudalige |
| 2010/0256836 | A1 | 10/2010 | Mudalige |
| 2011/0184605 | A1 | 7/2011 | Neff |
| 2012/0046819 | A1* | 2/2012 | Agrawal ............... G06Q 10/047 701/25 |
| 2012/0197464 | A1 | 8/2012 | Wang et al. |
| 2012/0316725 | A1* | 12/2012 | Trepagnier ............ G01S 17/023 701/26 |
| 2013/0211656 | A1 | 8/2013 | An et al. |
| 2014/0136414 | A1 | 5/2014 | Abhyanker |
| 2014/0156134 | A1 | 6/2014 | Cullinane et al. |
| 2015/0032322 | A1 | 1/2015 | Wimmer et al. |
| 2015/0051781 | A1* | 2/2015 | Schnieders ........... B60W 30/00 701/23 |
| 2015/0149017 | A1 | 5/2015 | Attard et al. |
| 2015/0202770 | A1 | 7/2015 | Patron et al. |
| 2015/0203107 | A1 | 7/2015 | Lippman |
| 2015/0248131 | A1 | 9/2015 | Fairfield et al. |
| 2015/0309512 | A1 | 10/2015 | Cudak et al. |
| 2015/0323932 | A1 | 11/2015 | Paduano et al. |
| 2015/0346718 | A1 | 12/2015 | Stenneth |
| 2015/0346727 | A1 | 12/2015 | Ramanujam |
| 2015/0370251 | A1 | 12/2015 | Siegel et al. |

FOREIGN PATENT DOCUMENTS

| | | |
|---|---|---|
| DE | 102012016802 | 2/2014 |
| DE | 10 2013 008605 A1 | 11/2014 |
| EP | 2314490 | 4/2011 |
| WO | 2010131102 | 11/2010 |
| WO | 2013034347 | 3/2013 |
| WO | 2014139821 A1 | 9/2014 |
| WO | 2014191657 A1 | 12/2014 |

OTHER PUBLICATIONS

Website XP 002685503, Internet Article Dated Jun. 23, 2011, Google Machine Translation attached to orignal articlem, All together 7 Pages, Retrieved from the Internet on Jun. 22, 2015, "Research project: traveling and driving the car at the request almost automatically with TAP, The temporary autopilot Volkswagen." http://www.heise.de/autos/artikel/Der-temporaere-Autopilot-von-Volkswagen-1268480.html.
NPL Extended European Search Report for European Application No. 14157579.5, Completed by the European Patent Office, Dated Aug. 13, 2014, 5 Pages.
Notice of Allowance and Fees Due for related U.S. Appl. No. 14/633,462, issued by the U.S. Patent and Trademark Office, dated Jun. 22, 2016, 14 pages.
Extended European Search Report for European Application No. 14157576.1, completed by the European Patent Office, dated Jul. 7, 2014, 6 pages.
U.S. non-final Office Action for U.S. Appl. No. 14/633,462, issued by the U.S. Patent and Trademark Office, dated Jan. 29, 2016, 17 pages.
Notice of Allowance and Fees Due, for U.S. Appl. No. 14/633,462, completed by the U.S. Patent and Trademark Office, dated Nov. 3, 2016.

\* cited by examiner

APPARATUS AND METHOD FOR CONTINUOUSLY ESTABLISHING A BOUNDARY FOR AUTONOMOUS DRIVING AVAILABILITY AND AN AUTOMOTIVE VEHICLE COMPRISING SUCH AN APPARATUS

CROSS-REFERENCE TO RELATED APPLICATIONS

This application claims foreign priority benefits under 35 U.S.C. §119(a)-(d) to European Patent Application No. 14157579.5, filed Mar. 4, 2014, which is incorporated by reference in its entirety.

TECHNICAL FIELD

Embodiments herein relate to an apparatus and method for continuously establishing a boundary for autonomous driving availability, in a vehicle having autonomous driving capabilities as well as an automotive vehicle having autonomous driving capabilities that comprises such an apparatus.

BACKGROUND

One area of automotive vehicle technology that is evolving rapidly is the area of autonomous or semi-autonomous drive capabilities. This is enabled through the introduction of sensors, for sensing vehicle parameters and surroundings, and actuators, for controlling different vehicle functionalities, such as steering, throttling and braking. Increased on-board data processing capabilities ties together these sensors and actuators such that the autonomous or semi-autonomous drive capabilities are enabled.

When the vehicle runs in autonomous mode, which means the driver does not perform maneuvers, it usually requires multiple data sources as inputs to perform the autonomous driving, such as detection of surrounding vehicles, traffic lanes, obstacles, data from navigation systems and so on. However, should one or more of these inputs not be available, there might not be sufficient information to perform autonomous driving. In such cases a driver-hand over may be requested in order to ensure road safety.

A previous document, U.S. Pat. No. 8,433,470, relates to a user interface for displaying an internal state of an autonomous driving system. In the event of an emergency situation identified by a control computer of the automated vehicle, it may immediately convey this information to a passenger in a variety of ways. For example, if the control computer is no longer able to control the vehicle safely, illuminated indicators may change color, to inform the user of the immediate need to take control of the steering wheel. The control computer may also send audio alerts to the passenger stating that there is an emergency and the passenger is required to take control of the steering wheel. The control computer may further use cameras to scan the passenger's eyes and/or other features. If the control computer determines that the eyes are closed or the body is slumped over (e.g. the passenger is sleeping or under the influence of drugs or alcohol), the control computer may take emergency control of the vehicle and use audible alerts to wake or otherwise get the attention of the driver.

However, during autonomous driving a vehicle driver may desire to use the time when the vehicle runs in autonomous mode, and the driver is not required to perform maneuvers, to perform other activities, e.g. resting, reading, watching a movie or similar. Being otherwise occupied will, depending on the circumstances, of course affect the vehicle driver's readiness to respond to a request to assume manual control of the vehicle.

Another previous document, U.S. Pat. No. 5,774,069, relates to an auto-drive control unit which can switch a vehicle provided with an auto-drive mode from the auto-drive mode to a manual drive mode at a desired point. The scheduled location (desired point) where the vehicle is to run in the manual drive is assumed to be a safety zone of the auto-drive lane, such as an interchange. Based on detection signals from various types of sensors, an auto-drive controller controls an actuator to perform auto-drive. A changeover switch is provided to switch between the auto-drive and manual drive. When the vehicle is running in the auto-drive mode, the current position of the vehicle is continuously detected on the basis of a signal from a GPS, and the vehicle speed is checked according to a signal from a vehicle speed sensor. After checking the location and the vehicle speed, an expected time of arrival at the destination, namely the scheduled location (desired point) where the drive should be changed to the manual drive, is calculated according to such data. According to a shifting time to complete the shift to the manual drive, timing for operating the changeover switch is determined, and a message is shown on a warning display to urge a driver to operate the switch. In one embodiment, it is judged in view of a prescribed shifting time whether or not the shift from the auto-drive mode to the manual drive mode can be completed before the vehicle has reached a destination and an appropriate measure is taken according to the judged result, so that the changeover to the manual drive can be made reliably at the desired point.

However, although alerting the driver in time, so that the changeover to the manual drive can be made reliably, the message shown on the warning display urging the driver to operate the changeover switch will potentially catch an otherwise occupied driver off guard. Being caught off guard will most likely affect the vehicle driver's readiness to respond to the request to assume manual control of the vehicle.

SUMMARY

Embodiments herein aim to provide an improved apparatus for continuously establishing a boundary for autonomous driving availability, in a vehicle having autonomous driving capabilities, the vehicle comprising: at least one remote sensor configured to acquire vehicle surrounding information; and at least one vehicle dynamics sensor configured to determine vehicle dynamics parameters.

This is provided through an apparatus that further comprises at least one of: a positioning arrangement configured to provide map data with associated speed limit and road infrastructure information; a route planning arrangement; a vehicle driver monitoring arrangement configured to provide vehicle driver monitoring information; and an arrangement for acquiring real time information, including at least one of real time traffic information and real time weather information, and further: a processor configured to continuously calculate a boundary for autonomous driving availability based on a planned route and at least one of vehicle surrounding information, vehicle dynamics parameters, vehicle driver monitoring information, map data with associated speed limit and infrastructure information, real time traffic information and real time weather information, associated with the planned route, and a human machine interface configured to output to a vehicle passenger compartment information on any changes in the calculated boundary for autonomous driving availability along the planned route.

The provision of a continuously calculated boundary for autonomous driving availability and a human machine interface configured to output to a vehicle passenger compartment information on any changes in the calculated boundary for autonomous driving availability along the planned route promotes the driver's trust in the autonomous driving capabilities of the vehicle as well as increases the drivers readiness to assume manual control of the vehicle if so required.

According to a second aspect is provided that the processor further is configured to calculate a hand over time, required for hand over from autonomous driving to manual driving, and to compare the calculated hand over time with the calculated boundary for autonomous driving availability and to provide a request for hand over from autonomous driving to manual driving should the comparison indicate that the calculated boundary for autonomous driving availability is within a predetermined range of the calculated hand over time.

The provision of providing a request for hand over from autonomous driving to manual driving should a comparison indicate that the calculated boundary for autonomous driving availability is within a predetermined range of the calculated hand over time ensures that the boundary will always be such that it provides sufficient time for safe hand over from autonomous driving to manual driving, thus ensuring that the vehicle driver does not suffer a stressful and potentially dangerous transition to manual driving.

According to a third aspect is provided that it further comprises an interface for communicating the information on any changes in the calculated boundary for autonomous driving availability along the planned route to an autonomous drive control unit of the vehicle.

The provision of communicating the information on any changes in the calculated boundary for autonomous driving availability along the planned route to an autonomous drive control unit of the vehicle enables vehicle systems to perform adaptations in dependence upon the available degree of automation indicated by the calculated boundary for autonomous driving availability.

According to a fourth aspect is provided that the human machine interface further is configured to output to the vehicle passenger compartment information relating to changes in automation level available with the current calculated boundary for autonomous driving availability.

The provision of a human machine interface configured to output to the vehicle passenger compartment information relating to changes in automation level available with the current calculated boundary for autonomous driving availability enables a driver of the vehicle to become aware of why adaptations in the autonomous drive, e.g. towards a higher or lower degree of automation, is made and also enables the driver to continuously monitor the autonomous drive whilst retaining a feeling of control.

According to a fifth aspect is provided that the human machine interface is configured to output the information to the vehicle passenger compartment through at least one of a graphical, an audio or a tactile output arrangement.

The provision of outputting the information to the vehicle passenger compartment through at least one of a graphical, an audio or a tactile output arrangement provides several options for ensuring that the information reaches the vehicle driver, irrespective of his/her current focus.

According to a sixth aspect is provided that the arrangement for acquiring real time information, when present, comprises an interface for communication via one or more portable communication devices of vehicle occupants for acquiring the real time information.

The provision of an interface for communication via one or more portable communication devices of vehicle occupants for acquiring the real time information enables either the realization of a less complex and more cost effective apparatus or alternatively the provision of a redundant back-up channel for acquiring the real time information.

According to a seventh aspect is provided that the arrangement for acquiring real time information, when present, comprises an interface for performing at least one of vehicle-to-vehicle and vehicle-to-infrastructure communication for acquiring the real time information.

The provision of an interface for performing at least one of vehicle-to-vehicle and vehicle-to-infrastructure communication for acquiring the real time information enables the realization of an effective apparatus for acquiring real time information which is highly relevant for the current surroundings.

According to an eight aspect is provided that it further comprises an interface for communicating the information on any changes in the calculated boundary for autonomous driving availability along the planned route externally of the vehicle using at least one or more portable communication devices of vehicle occupants, vehicle-to-vehicle communication and vehicle-to-infrastructure communication.

The provision of an interface for communicating the information externally of the vehicle using at least one or more portable communication devices of vehicle occupants, vehicle-to-vehicle communication and vehicle-to-infrastructure communication enables traffic control centers and vehicles travelling in the vicinity of the own vehicle to make use of the information on any changes in the calculated boundary for autonomous driving availability along the planned route.

Further embodiments herein aim to provide a method for continuously establishing a boundary for autonomous driving availability, in a vehicle having autonomous driving capabilities, the vehicle comprising: at least one remote sensor configured to acquire vehicle surrounding information; and at least one vehicle dynamics sensor configured to determine vehicle dynamics parameters.

This is provided through a method comprising at least one of the steps of: providing map data with associated speed limit and road infrastructure information using a positioning arrangement performing route planning using a route planning arrangement monitoring a vehicle driver and providing vehicle driver monitoring information using a vehicle driver monitoring arrangement; and acquiring real time information, including at least one of real time traffic information and real time weather information, and the steps of: continuously calculating, using a processor, a boundary for autonomous driving availability based on based on a planned route and at least one of vehicle surrounding information, vehicle dynamics parameters, vehicle driver monitoring information, map data with associated speed limit and infrastructure information, real time traffic information and real time weather information, associated with the planned route, and outputting, to a human machine interface arranged in a vehicle passenger compartment, information on any changes in the calculated boundary for autonomous driving availability along the planned route.

The provision of calculating a boundary for autonomous driving availability and outputting to a human machine interface arranged in a vehicle passenger compartment this calculated boundary for autonomous driving availability enables a driver of the vehicle to confidently use an available autonomous driving capability of the vehicle whilst being prepared to respond to a request to assume manual control of the vehicle.

According to a final aspect is provided an automotive vehicle having autonomous driving capabilities which comprises an apparatus for continuously establishing a boundary for autonomous driving availability as above.

An automotive vehicle which comprises an apparatus for continuously establishing a boundary for autonomous driving availability in a vehicle having autonomous driving capabilities and to output to a vehicle passenger compartment this calculated boundary for autonomous driving availability enables a driver of the vehicle to confidently use an available autonomous driving capability of the vehicle whilst being prepared to respond to a request to assume manual control of the vehicle.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments of the present disclosure are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
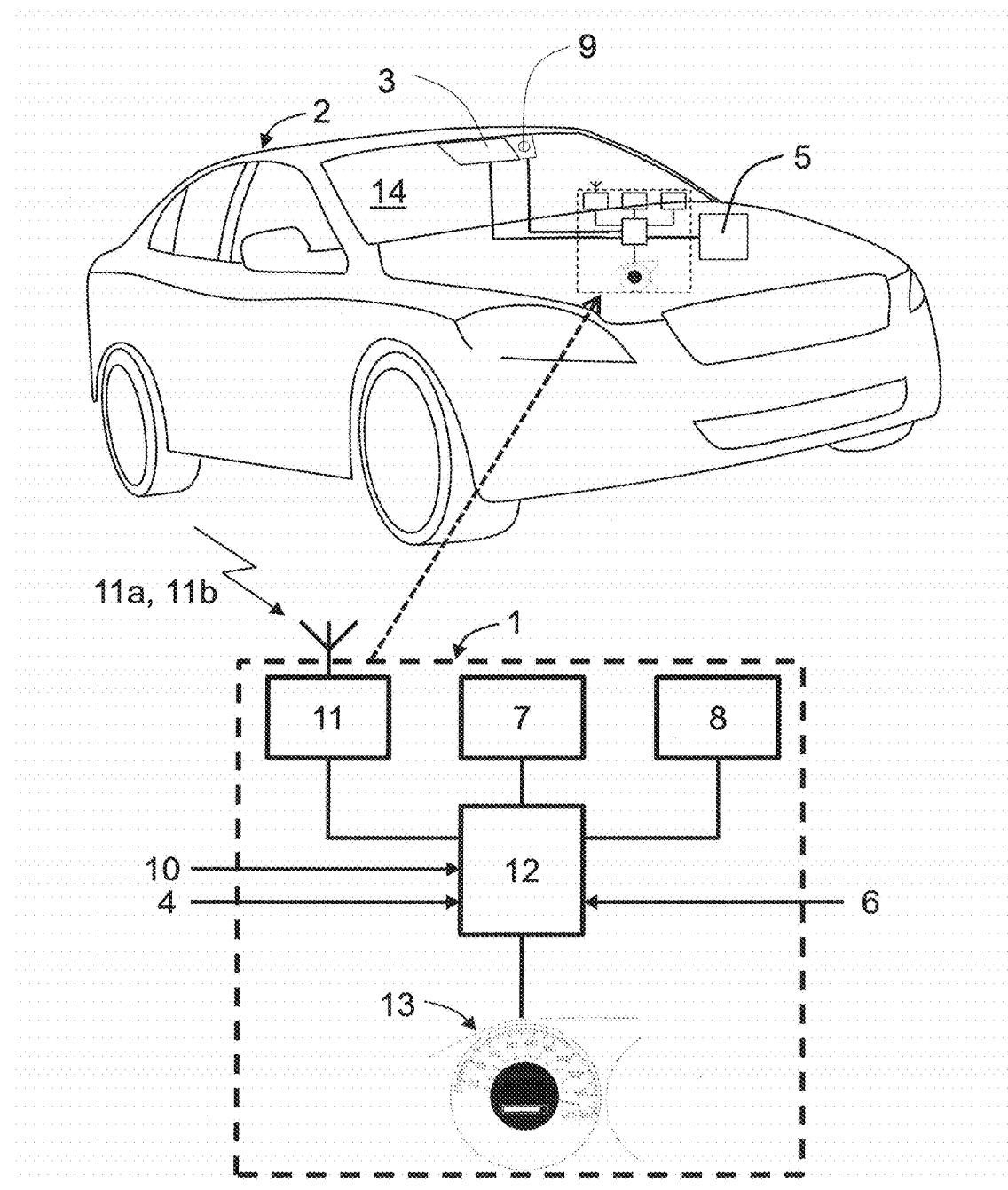
FIG. 1 is a schematic illustration of an apparatus for continuously establishing a boundary for autonomous driving availability, in a vehicle having autonomous driving capabilities according to embodiments herein.

In overview, embodiments herein relate to an apparatus 1 for continuously establishing a boundary for autonomous driving availability in a vehicle 2 having autonomous driving capabilities, the vehicle 2 comprising: remote sensors 3 configured to acquire vehicle surrounding information 4; and vehicle dynamics sensors 5 configured to determine vehicle dynamics parameters 6, as illustrated in FIG. 1

In many traffic situations a driver today will have a rather low workload, as the driving task as such is rather uncomplicated (e.g. when driving on high-ways and on country roads with fence separation from on-coming traffic). Even with today's limited sensing systems, such situations could be handled by the vehicle itself, in a fully automated mode. However, the apparatus 1 herein described is based on the realization that a driver needs to be continuously informed where such autonomous driving situations are predicted to be possible or rather where such autonomous driving situations are deemed not possible.

A vehicle 2 having autonomous driving capabilities will include a vehicle controller (not shown) for controlling unmanned autonomous driving. The vehicle controller will e.g. pursue a route to a final destination, and control the vehicle 2 so that the vehicle 2 can perform autonomous driving along the route to the final destination in an unmanned manner. Usually, when a fixed or movable obstacle is present in the route to the final destination, the vehicle controller will detect the object, using vehicle remote sensor systems 3 such as one or more of a Radio Detection And Ranging (RADAR) sensor, a Light Detection And Ranging (LIDAR) sensor, a Light Amplification by Stimulated Emission of Radiation (LASER) sensor, an ultrasound sensor, an infrared sensor, an image sensor, or any combination thereof. Thereafter the vehicle controller will control vehicle actuators (not shown), such as steering, braking and throttle actuators, in order to avoid the detected obstacle, or temporarily halt vehicle 2 travel in order to avoid a collision with the detected object.

The vehicle controller, of the vehicle 2 having autonomous driving capabilities, may also comprise or be arranged or configured to control sub-systems such as cruise control systems, so-called ACC (Adaptive Cruise Control) systems, which monitor the front area of the vehicle 2, with the aid of e.g. a radar sensor, and automatically regulate the distance to a preceding vehicle, as well as automatic lane-keeping systems and combinations of such systems.

The apparatus 1 further comprises at least one of: a positioning arrangement 7 arranged or configured to provide map data with associated speed limit and road infrastructure information; a route planning arrangement 8; a vehicle driver monitoring arrangement 9 arranged or configured to provide vehicle driver monitoring information 10; and an arrangement for acquiring real time information 11, including at least one of real time traffic information 11a and real time weather information 11b.

The positioning arrangement 7, when present, is, as mentioned above, arranged or configured to provide map data with associated speed limit and road infrastructure information. The positioning arrangement may comprise a navigation system, such as a global positioning system (GPS) or equivalent.

The route planning arrangement 8, when present, is provided by the apparatus 1, such that a route to be travelled may be planned by a vehicle 2 driver, a traffic control center, a logistics center or similar. Route planning may be made using an interface (not shown) provided in a passenger compartment 14 of the vehicle 2 or alternatively via a remote interface (not shown) arranged or configured to communicate with the route planning arrangement 8, e.g. through a wireless communication network.

If the autonomous driving capability is simply activated on a road travelled, without any knowledge of a planned route, establishing of a boundary for autonomous driving availability will suitably be based on road infrastructure, such as the presence of motorway exits, crossings and other potentially limiting infrastructure elements along the road travelled. In this case the boundary for autonomous driving availability will have to be adapted to allow a driver to take control before e.g. the next exit, in order to be able to make a decision to exit the road or to continue driving thereupon.

The vehicle driver monitoring arrangement 9, when present, is arranged or configured to provide vehicle driver monitoring information 10, e.g. from a driver monitoring camera.

The arrangement for acquiring real time information 11, when present, includes an arrangement for acquiring at least one of real time traffic information 11a and real time weather information 11b.

Further, a processor 12 is arranged or configured to continuously calculate a boundary for autonomous driving availability based on a planned route and at least one of vehicle surrounding information 4, vehicle dynamics parameters 6, vehicle driver monitoring information 10, map data with associated speed limit and infrastructure information, real time traffic information 11a and real time weather information 11a, associated with the planned route. If a predefined route has been planned more information will be available to the processor 12, thus enabling it to more accurately establish the boundary for autonomous driving availability.

Figure 2:
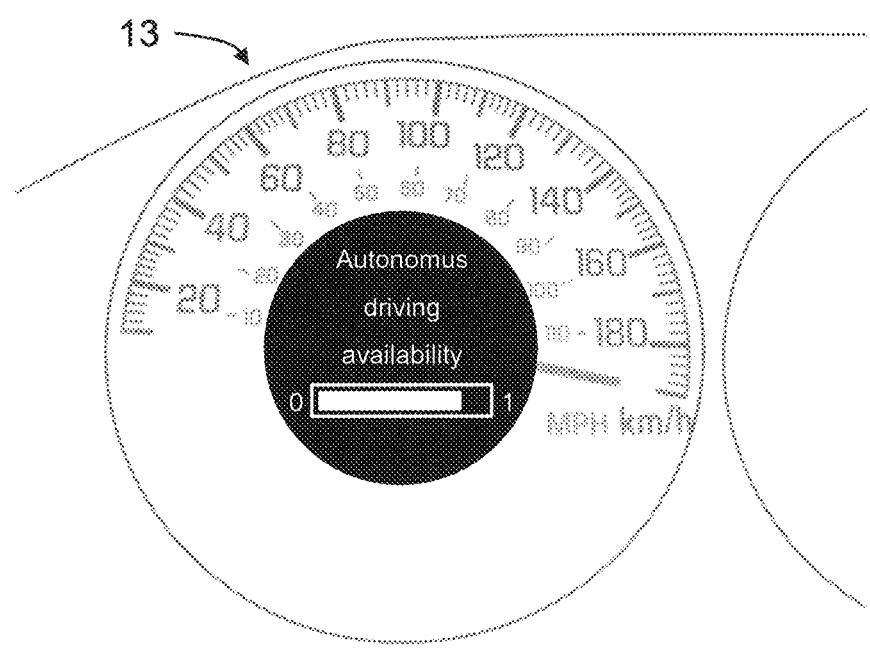
FIG. 2 is a schematic illustration of a human machine interface configured to output to a vehicle passenger compartment information on any changes in the calculated boundary for autonomous driving availability along a planned route according to embodiments herein.

In order to enable a driver of the vehicle 2 to confidently use the autonomous driving functionality a human machine interface (HMI) 13 is arranged or configured to output to a vehicle 2 passenger compartment 14 information on any changes in the calculated boundary for autonomous driving availability along the planned route. Hereby the driver can confidently monitor a current status of an autonomous driving session. An example embodiment of such an HMI 13, arranged or configured at the dashboard of a vehicle 2, is illustrated in FIG. 2. As illustrated, the HMI 13 may be arranged or configured to present the information graphically to a display, e.g. as an automation level, where the bar indicates a distance to the calculated boundary for autonomous driving availability. The proximity to the calculated boundary for autonomous driving availability is here indicated by the extension of the bar from the marking "0" towards the marking "1". The HMI 13 may also be arranged or configured to present the information as any suitable graphical element, as audible information and/or as tactile information, e.g. through vibrations to a vehicle driver seat or similar, or any combination of the above elements. Thus, the apparatus 1 continuously informs a driver of the vehicle 2 having autonomous driving capabilities where such autonomous driving is predicted to be possible and not possible.

The processor 12 is arranged or configured to continuously calculate the boundary for autonomous driving availability using an algorithm and to communicate this boundary using the HMI 13. The boundary for autonomous driving availability changes continuously and predicts a traffic situation a certain time ahead. The prediction time needs to be sufficient to allow a driver of the vehicle 2 to take over the responsibility for control of the vehicle 2. However, the prediction time should be short in order not to generate false manual control requests. The boundary for autonomous driving availability will change depending on variables that, as indicated above, include: driver distraction as indicated by vehicle driver monitoring information 10, vehicle speed as indicated by vehicle dynamics parameters or a GPS signal, traffic density as indicated by real time traffic information 11a or vehicle surrounding information 4, geographic location as indicated by map data provided by the positioning arrangement, GPS availability, electronic horizon data, and weather conditions as indicated by real time weather information. The boundary function is a possibly non-linear weighting of several local functions, such as vehicle speed vs. weather conditions, resulting in a multi-dimensional surface. The resulting output is the available automation level. During operation sub-functions or dimensions that are causing an automation stop may be communicated to the driver using the HMI 13.

Such an algorithm, suitable for use by the processor 12 to continuously calculate the boundary for autonomous driving availability, may e.g. be based on set-theory. For example, if one considers the following set description $S=S1+S2+S3+\ldots$, where $$S1=-(v-v\_cent)^2-r\_v$$

showing autonomous driving availability with respect to velocity. The v_cent term is optional and aims at centering on a given velocity. This can be omitted if one makes sure that the function evaluation is performed only for relevant velocity values, e.g. only for positive velocities. Similarly, S2 may be road type, e.g. such that discrete values of a road type coding are translated to a continuous space. S3 may be road conditions, such as icy road or inferior lane markings S4 may indicate availability of vehicle-to-infrastructure (V2X) communication. S5 may be weather conditions, e.g. visibility and S6 may be driver status, as indicated by the vehicle driver monitoring arrangement 9, and so on.

The resulting function will be a set that describes the availability of autonomous driving. The above set may be represented graphically by a projection to some of the planes or by evaluating it for several points around the actual operating point, e.g. as in the following example.

Consider that the actual operating point is v=50 kph, icy road, vehicle-to-infrastructure communication unavailable. Evaluating S will result in a scalar. Now this may be displayed on a bar as a single point, where the bar is obtained by evaluating the function for a velocity interval. Should an evaluation of the actual operating point provide a result above a given threshold, than autonomous driving is available. This information can be used for controlling the vehicle 2 and/or relaying any autonomous driving limiting information to the driver of the vehicle 2.

Figure 3:
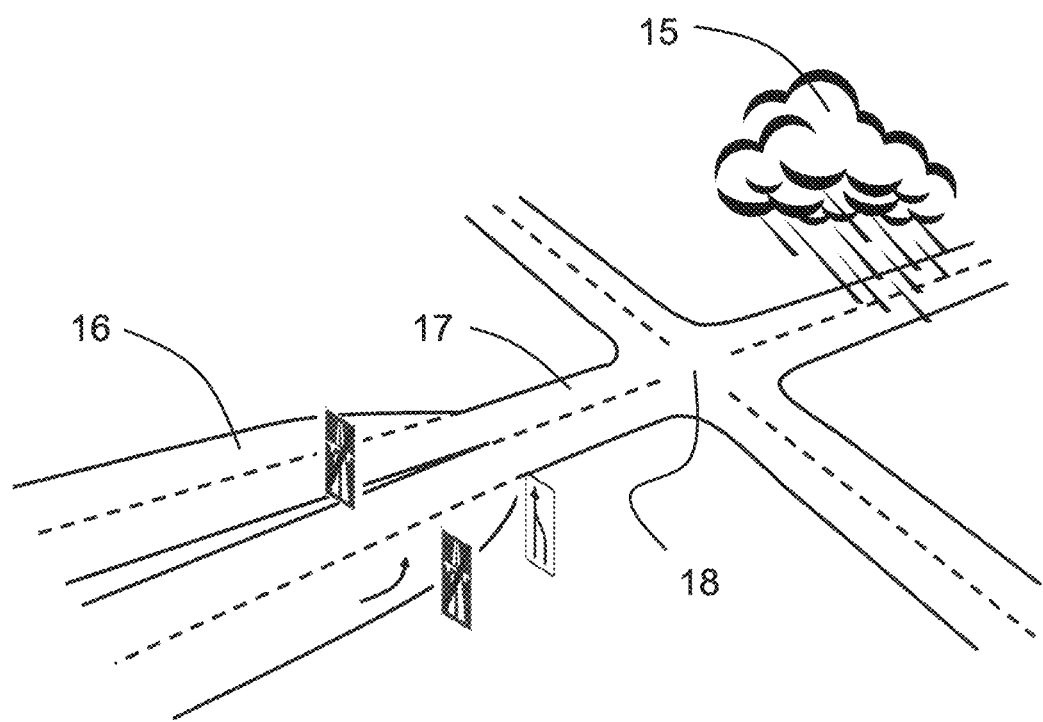
FIG. 3 is a schematic illustration of road infrastructure, traffic and weather conditions along a planned route according to embodiments herein.

As mentioned above, environmental conditions may restrict autonomous driving. FIG. 3 illustrates examples of such restrictions. If heavy rain 15 or snow is present further ahead along the planned route this might be the limiting factor for autonomous driving beyond that point. Typical restricting information for this functionality will be map data with speed limitations and real time traffic information, real time weather information 11b etc., associated with the planned route.

Further, road infrastructure may restrict autonomous driving. For example a multiple lane motorway 16 with no oncoming traffic may end into a two-way traffic road 17 comprising a crossing 18. If a motorway exit or a crossing 18 is present further ahead along the planned route this might be the limiting factor for autonomous driving beyond that point. Typical restricting information for this functionality will be map data with road infrastructure information associated with the planned route.

Thus, the apparatus 1 provide to a driver of the vehicle 2 information on any changes in the calculated boundary for autonomous driving availability along the planned route based on external factors limiting the vehicle's ability to drive by itself.

In embodiments hereof the processor 12 further is arranged or configured to calculate a hand over time, required for hand over from autonomous driving to manual driving, and to compare the calculated hand over time with the calculated boundary for autonomous driving availability and to provide a request for hand over from autonomous driving to manual driving should the comparison indicate that the calculated boundary for autonomous driving availability is within a predetermined range of the calculated hand over time.

Hereby is ensured that the boundary will always be such that it provides sufficient time for safe hand over from autonomous driving to manual driving, thus ensuring that the vehicle 2 driver does not suffer a stressful and potentially dangerous transition to manual driving.

In further embodiments hereof the apparatus 1 further comprises an interface for communicating the information to an autonomous drive control unit of the vehicle. This enables vehicle 2 systems to perform adaptations in dependence upon the available degree of automation indicated by the calculated boundary for autonomous driving availability.

In other embodiments hereof the HMI 13 further is arranged or configured to output to the vehicle 2 passenger compartment 14 information relating to changes in automation level available with the current calculated boundary for autonomous driving availability. This enables the driver of the vehicle 2 to continuously monitor the autonomous drive whilst retaining a feeling of being in control, or at least fully aware of the intentions of the autonomous drive system.

In still further embodiments hereof the HMI 13 is arranged or configured to output the information to the vehicle passenger compartment 14 through at least one of a graphical, an audio or a tactile output arrangement. Hereby is enabled several options for ensuring that the information reaches the vehicle 2 driver, irrespective of his/her current focus.

In further embodiments hereof the arrangement for acquiring real time information 11, when present, comprises an interface for communication via one or more portable communication devices of vehicle occupants (not shown) for acquiring the real time information 11$a$, 11$b$. Such an interface may rely on a wired connection to one or more portable communication devices or alternatively a wireless connection to one or more portable communication devices, e.g. based on WiFi, Bluetooth or similar wireless communication technologies. This enables either the realization of a less complex and more cost effective apparatus 1 or alternatively the provision of a redundant back-up channel for acquiring the real time information 11$a$, 11$b$.

In yet further embodiments the arrangement for acquiring real time information 11, when present, comprises an interface (not shown) for performing at least one of vehicle-to-vehicle (V2V) and vehicle-to-infrastructure (V2X) communication for acquiring the real time information. Such an interface will normally rely on suitable wireless communication protocols for communicating with vehicles and infrastructures in relevant vicinity of the vehicle 2 hosting the apparatus 1. This enables the realization of an effective apparatus for acquiring real time information 11$a$, 11$b$ which is highly relevant for the current surroundings.

In still further embodiments hereof the apparatus 1 further comprises an interface (not shown) for communicating the information on any changes in the calculated boundary for autonomous driving availability along the planned route externally of the vehicle 2 using at least one or more portable communication devices of vehicle occupants, vehicle-to-vehicle communication and vehicle-to-infrastructure communication. This enables traffic control centers and vehicles travelling in the vicinity of the own vehicle 2 to make use of the information on any changes in the calculated boundary for autonomous driving availability along the planned route.

Further possible boundary conditions for allowing autonomous driving, and thus affecting the calculated boundary for autonomous driving availability, are: traffic intensity; presence/absence of oncoming traffic; speed limitations; the number of adjacent lanes; information on accidents or road-work further along the planned route, etc. . . .

Other possible boundary conditions could be: a requirement of another vehicle in front (e.g. a requirement of travelling in a queue); only being allowed to stay in the actual lane (i.e. prevented from changing lanes); only allowed to drive on highways (with no oncoming traffic). A possible requirement to have another vehicle in front will depend on real time traffic information 11$a$. The apparatus 1 may also consider specific events, e.g. accept a short disturbance in a motorways exit, such that if a lead vehicle is required and this lead vehicle leaves the motorway, autonomous driving of the vehicle 2 may still be allowed for a limited section without a lead vehicle ahead. If the availability of potential new lead vehicles is known, motorway exits may not be restricting the calculated boundary for autonomous driving availability.

If, for example, the boundary conditions for the vehicle 2 are that it is only allowed to drive on highways (with no oncoming traffic) and another vehicle ahead, which it follows, the boundary for autonomous driving availability would normally be at a chosen highway exit, as long as the vehicle ahead (queue) is maintained, i.e. in dense traffic. However, should the real time traffic information 11$a$ indicate that the queue is breaking up, such that it becomes difficult to maintain the requirement of another vehicle ahead, the boundary for autonomous driving availability will be recalculated, e.g. dependent on the speed limit for autonomous driving applying to the road travelled, and an update presented to the vehicle 2 driver via the human machine interface 13.

According to the present application is also envisaged a method for continuously establishing a boundary for autonomous driving availability, in a vehicle 2 having autonomous driving capabilities, the vehicle 2 comprising: remote sensors 3 arranged or configured to acquire vehicle surrounding information 4; and vehicle dynamics sensors 5 arranged or configured to determine vehicle dynamics parameters 5.

Accordingly the proposed method comprises at least one of the steps of: providing map data with associated speed limit and road infrastructure information using a positioning arrangement 7;—performing route planning using a route planning arrangement 8; monitoring a vehicle driver and providing vehicle driver monitoring information using a vehicle driver monitoring arrangement 9; and—acquiring real time information, including at least one of real time traffic information 11$a$ and real time weather information 11$b$, and the steps of: continuously calculating, using a processor 12, a boundary for autonomous driving availability based on based on a planned route and at least one of vehicle surrounding information 4, vehicle dynamics parameters 6, vehicle driver monitoring information 10, map data with associated speed limit and infrastructure information, real time traffic information 11$a$ and real time weather information 11$b$, associated with the planned route; and—outputting to a human machine interface 13 arranged or configured in a vehicle 2 passenger compartment 14 information on any changes in the calculated boundary for autonomous driving availability along the planned route.

In accordance with the present application is also envisaged an automotive vehicle 2 having autonomous driving capabilities comprising an apparatus 1 for establishing a boundary for autonomous driving availability as described in the foregoing.

Although the above description mainly describes passenger car vehicles, the teachings provided herein may, without loss of generality, be expanded to consider commercial vehicles, such as buses, trucks and similar vehicles having autonomous driving capabilities, without loss of generality. The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. An apparatus for continuously establishing a boundary for autonomous driving availability in a vehicle having autonomous driving capabilities, the vehicle comprising at least one remote sensor configured to acquire vehicle surrounding information and at least one vehicle dynamics sensor configured to determine vehicle dynamics parameters, the apparatus comprising:

at least one of a positioning arrangement configured to provide map data with associated speed limit and road infrastructure information, a route planning arrangement, a vehicle driver monitoring arrangement configured to provide vehicle driver monitoring information, and an arrangement for acquiring real time information including at least one of real time traffic information and real time weather information;

a processor configured to continuously calculate a boundary for autonomous driving availability based on a planned route and at least one of vehicle surrounding information, vehicle dynamics parameters, map data with associated speed limit and infrastructure information, vehicle driver monitoring information, real time traffic information and real time weather information, associated with the planned route, wherein the boundary comprises a location on the planned route beyond which the processor predicts autonomous driving is not possible; and a human machine interface configured to output to a vehicle passenger compartment information on any changes in the calculated boundary for autonomous driving availability along the planned route.

2. The apparatus of claim 1 wherein the processor further is configured to calculate a hand over time, required for hand over from autonomous driving to manual driving, and to compare the calculated hand over time with the calculated boundary for autonomous driving availability and to provide a request for hand over from autonomous driving to manual driving should the comparison indicate that the calculated boundary for autonomous driving availability is within a predetermined range of the calculated hand over time.

3. The apparatus of claim 1 further comprising an interface for communicating the information on any changes in the calculated boundary for autonomous driving availability along the planned route to an autonomous drive control unit of the vehicle.

4. The apparatus of claim 1 wherein the human machine interface further is configured to output to the vehicle passenger compartment information relating to changes in automation level available with the current calculated boundary for autonomous driving availability.

5. The apparatus of claim 1 wherein the human machine interface is configured to output the information to the vehicle passenger compartment through at least one of a graphical, an audio or a tactile output arrangement.

6. The apparatus of claim 1 wherein the arrangement for acquiring real time information, when present, comprises an interface for communication via one or more portable communication devices of vehicle occupants for acquiring the real time information.

7. The apparatus of claim 1 wherein the arrangement for acquiring real time information, when present, comprises an interface for performing at least one of vehicle-to-vehicle and vehicle-to-infrastructure communication for acquiring the real time information.

8. The apparatus of claim 1 further comprising an interface for communicating the information on any changes in the calculated boundary for autonomous driving availability along the planned route externally of the vehicle using at least one or more portable communication devices of vehicle occupants, vehicle-to-vehicle communication and vehicle-to-infrastructure communication.

9. A method for continuously establishing a boundary for autonomous driving availability in a vehicle having autonomous driving capabilities, the vehicle comprising at least one remote sensor configured to acquire vehicle surrounding information and at least one vehicle dynamics sensor configured to determine vehicle dynamics parameters, the method comprising:

at least one of providing map data with associated speed limit and road infrastructure information using a positioning arrangement, performing route planning using a route planning arrangement, monitoring a vehicle driver and providing vehicle driver monitoring information using a vehicle driver monitoring arrangement, and acquiring real time information including at least one of real time traffic information and real time weather information;

continuously calculating, using a processor, a boundary for autonomous driving availability based on a planned route and at least one of vehicle surrounding information, vehicle dynamics parameters, map data with associated speed limit and infrastructure information, vehicle driver monitoring information, real time traffic information and real time weather information, associated with the planned route, wherein the boundary comprises a location on the planned route beyond which the processor predicts autonomous driving is not possible; and outputting, to a human machine interface configured in a vehicle passenger compartment, information on any changes in the calculated boundary for autonomous driving availability along the planned route.

10. An automotive vehicle having autonomous driving capabilities and comprising:
at least one remote sensor configured to acquire vehicle surrounding information;
at least one vehicle dynamics sensor configured to determine vehicle dynamics parameters; and
an apparatus for continuously establishing a boundary for autonomous driving availability, the apparatus comprising
at least one of a positioning arrangement configured to provide map data with associated speed limit and road infrastructure information, a route planning arrangement, a vehicle driver monitoring arrangement configured to provide vehicle driver monitoring information, and an arrangement for acquiring real time information including at least one of real time traffic information and real time weather information,
a processor configured to continuously calculate a boundary for autonomous driving availability based on a planned route and at least one of vehicle surrounding information, vehicle dynamics parameters, map data with associated speed limit and infrastructure information, vehicle driver monitoring information, real time traffic information and real time weather information, associated with the planned route, wherein the boundary comprises a location on the planned route beyond which the processor predicts autonomous driving is not possible, and
a human machine interface configured to output to a vehicle passenger compartment information on any changes in the calculated boundary for autonomous driving availability along the planned route.

* * * * *